Figure 1:
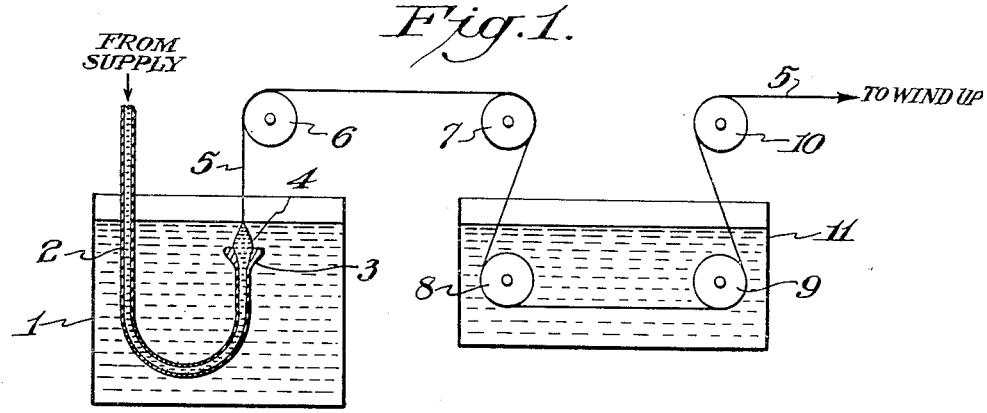

INVENTORS
EUGENE EDWARD MAGAT and
DONALD RITTLER STRACHAN
BY
ATTORNEY.

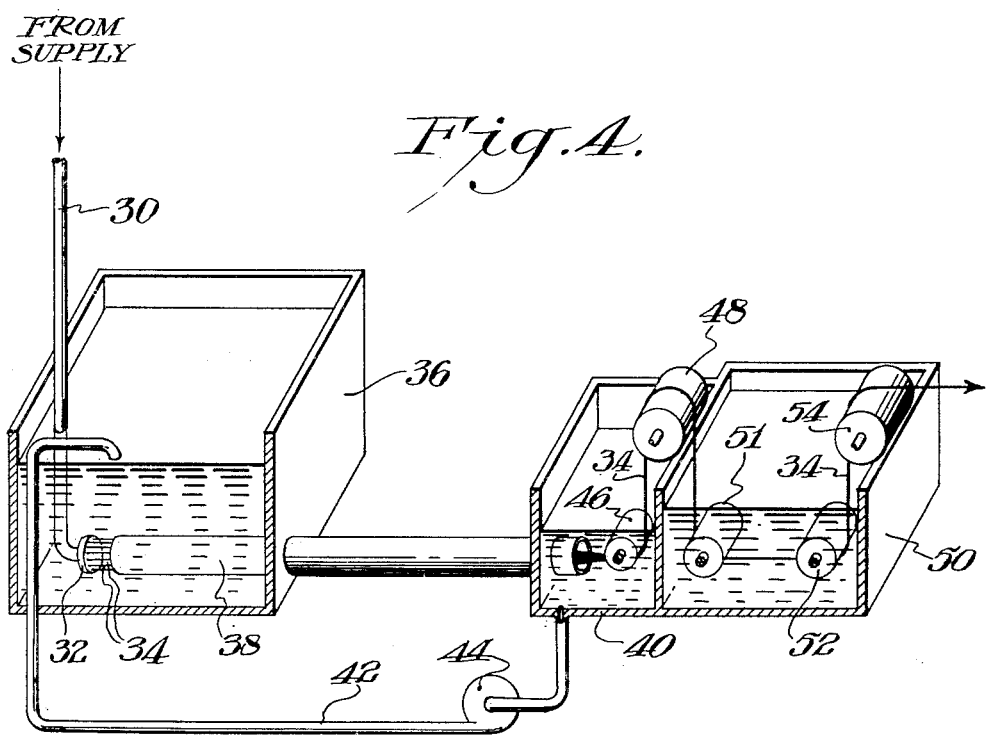

United States Patent Office 2,708,617
Patented May 17, 1955

2,708,617

FORMATION OF FILMS AND FILAMENT DIRECTLY FROM POLYMER INTERMEDIATES

Eugene Edward Magat and Donald Rittler Strachan, Wilmington, Del., assignors to E. I. du Pont de Nemours & Company, Wilmington, Del., a corporation of Delaware Application May 12, 1951, Serial No. 226,066

26 Claims. (Cl. 18—54)

This invention relates to the preparation of polymeric films and filaments, and is more particularly concerned with a process for the direct formation of condensation superpolymer films and filaments by a liquid phase polymerization of fast-reacting intermediates.

Synthetic linear condensation polymers such as superpolyamides, superpolyesters, polyurethanes, polyureas and the like, capable of yielding excellent fibers are now well known. These linear superpolymers of high molecular weight are usually prepared from two or more bifunctional reactants, for example, polyamides from dicarboxylic acids and diamines, polyurethanes from diisocyanates and dihydric alcohols, etc. While the properties of the fibers will of course vary considerably with the nature of the polymers used in their preparation, common characteristics after drawing are high tenacity, high orientation, lack of sensitivity toward conditions of humidity, extraordinary resistance to solvents and chemical reagents, exceptionally good elastic recovery and good aging characteristics in air, even at elevated temperatures. In addition, many of these fibers have high melting points which add to their utility as textile fibers.

Such superpolymers have been prepared in many different ways. The simple condensation polymers are usually prepared by condensing two difunctional ingredients under conditions such that the desired molecular weight is obtained. For example, polyamides are prepared from a dicarboxylic acid and a diamine by condensation at high temperatures, as described in Carothers' U. S. Patent No. 2,130,948. Polyesters are conveniently prepared by condensing a glycol with a dicarboxylic acid or a derivative thereof, such as the dimethyl or diethyl ester as described in U. S. Patent No. 2,465,319 to Whinfield and Dickson. Such reactions are usually slow and take hours to reach the high molecular weight needed for fiber and film preparation. In addition, they require high temperature conditions in the neighborhood of 200° C. and above. Furthermore, there are many theoretically possible polymers which cannot be prepared in this way because of instability of the reactants or of the desired polymer under such conditions.

Customarily, the high molecular weight fiber-forming linear condensation polymers are prepared by high temperature condensation of the polymer-forming reactants. The preparation of polyamides in this way for conversion into fibers is described by Carothers in U. S. Patents 2,071,253, 2,130,523, and 2,130,948. Depending on the method of spinning to be employed, the polymer must then be dissolved in a suitable solvent or melted and metered through a filter pack and spinneret assembly. Obviously, it would be highly advantageous to eliminate one or more of these operations, particularly those involving high temperatures in the preparation of shaped articles, such as films and fibers.

Heretofore it has been virtually impossible to prepare shaped articles of insoluble and infusible polyamides, polyesters and similar polymeric materials. Insolubility and infusibility generally stem from three dimensional polymer structures. These so-called "cross linked" polymers result when one or more of the polymer-forming reactants contain more than two reactive groups. The properties of insolubility and infusibility are sometimes important in certain end uses of films and fibers, and they have had to be obtained previously by special aftertreatments of the shaped articles prepared from soluble and fusible polymeric materials. There is great utility for a process by which insoluble and infusible films and fibers are prepared without chemical aftertreatment.

It is an object of the present invention to provide a process for preparing films and filaments of condensation polymers containing recurring amide and/or ester links in the molecular chains, such as the superpolyamides, superpolyesters, superpolyurethanes, superpolyureas and their sulfur-containing analogs, directly from two or more intermediates which react in liquid phase to form condensation polymers. A further object is to provide such a direct process for preparing films and filaments from intermediates which is rapid and avoids the use of high temperatures in the condensation polymerization. Another object is to provide a process suitable for preparing polymeric films and filaments which are difficult or impossible to prepare by conventional methods. Other objects will become apparent from the following description and the claims.

These objects are accomplished by conducting an interphase polymerization between fast-reacting organic condensation polymer-forming intermediates at an interface of controlled shape between two liquid phases, each of which contains an intermediate, to form a shaped condensation polymer and withdrawing the polymer from the interface. The process comprises bringing a liquid phase comprising one of the condensation polymer-forming intermediates (e. g., a liquid organic diamine or a solution of an organic diamine) and another liquid phase comprising the co-acting polymer-forming intermediate (e. g., a solution of an organic dicarboxylic acid halide) together to form a liquid-liquid interface, controlling the shape of the interface until a shaped polymer has formed at the interface, and then withdrawing the polymer from the interface. Preferably the polymer is withdrawn continuously from the interface as a continuous self-supporting film or filament.

In order for the process to be commercially practicable the pair of intermediates should react quickly so that the film or filament can be pulled away from the interface at a rapid rate. Several types of such fast-reacting intermediates are known. In general, one of the intermediates is a low molecular weight organic compound having two similar or dissimilar reactive groups selected from the group consisting of amino and amidino —NHR, wherein R is H or alkyl; phenolic —OH; and —SH; and the second intermediate is a low molecular weight organic compound having two reactive groups each of which is capable of reacting with ethyl alcohol at room temperature to thereby yield a compound having two ester groups. Such intermediates react rapidly to form superpolymers. In fact, the reaction is usually so rapid that it is usually necessary to prevent a violent reaction by dissolving at least one of the intermediates in a liquid diluent so that most of the molecules of dissolved reactant will have to diffuse through diluent to arrive at the reaction zone. Preferably, both reactants are dissolved in diluents and it is desirable that the solvent for one reactant be immiscible with the solvent for the other reactant. Preferably each intermediate is a liquid under the reaction conditions or is dissolved in a liquid diluent, but one of the intermediates may be a finely divided solid dispersed in a liquid diluent in which it is at least partially soluble.

It has recently been discovered that high molecular weight polymers such as polyamides, polysulfonamides, polyureas, polyurethanes, polyesters, polythiolesters, and the like can be prepared smoothly and rapidly at moderate temperatures, e. g. reacting an organic dicarboxylic acid halide with an organic primary or secondary diamine, dithiol or dihydroxyaryl compound in an emulsion system. A dilute aqueous solution of the diamine, dithiol, or dihydroxyaryl compound, preferably containing a hydrogen chloride acceptor, is reacted with a solution of the dibasic acid halide in a water-immiscible solvent, using sufficient agitation to emulsify the liquid phases. Apparently the reaction takes place at, or immediately adjacent to, the liquid-liquid interface only and side reactions, particularly termination reactions, are greatly reduced. High molecular weight polymers form rapidly and precipitate from the reaction mixture. The present invention utilizes principles of this new polymerization technique to prepare films and fibers of high molecular weight condensation polymers directly from the polymer-forming intermediates.

Figure 2:
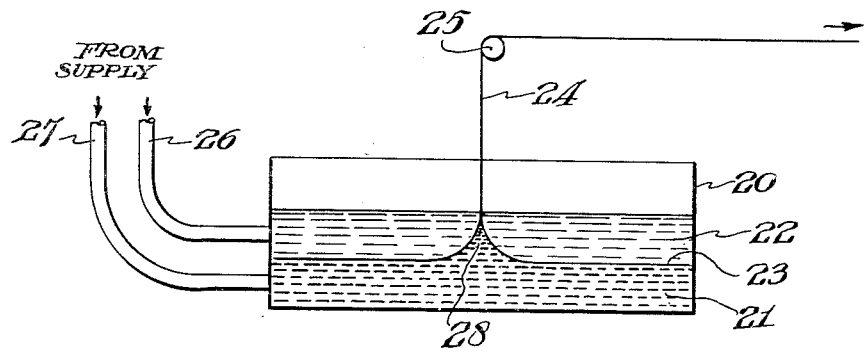
Figure 3:
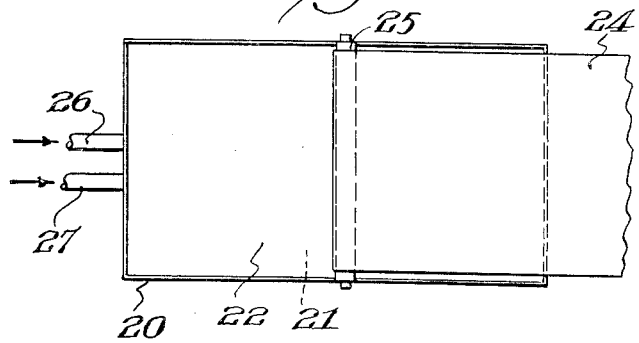

The examples which follow and the drawings merely illustrate this invention and are not to be construed as limitative. In the drawings, Figure 1 is a schematic representation of an apparatus for spinning filaments in accordance with this invention. Figure 2 is a front elevation of a simple apparatus for preparing ribbon or films and Figure 3 is a corresponding top view of the apparatus. Figure 4 is a schematic isometric representation, with parts cut away, of an apparatus suitable for spinning filaments from a spinneret in accordance with this invention.

Referring now to Figure 1, a suitable vessel or tank 1 contains a solution of one of the intermediates, while the liquid comprising the other intermediate is introduced through the J-shaped tube 2, flared at the delivery end 3. The liquid to be introduced through the J-tube is metered at a constant rate from a supply chamber, not shown. This liquid may be the undiluted intermediate or it may be a solution of the intermediate in an inert diluent, which is preferably immiscible with the solution in tank 1. The flared end 3 of the J-tube constitutes a small reservoir 4 which is kept supplied with the solution of the other intermediate. At the area of contact of the bubble-shaped pool of reactant liquid in this reservoir 4 with the reactant solution in tank 1, high molecular weight polymer forms very rapidly and can be drawn away from this area in the form of a filament 5. The filament 5 may be wound up directly or it may be led over suitable rollers 6, 7, 8, 9, 10 and washed prior to windup as illustrated in Figure 1. If the flared end 3 has an elongated shape, instead of circular, a ribbon or film of polymer can be drawn away continuously in a similar manner.

At the start-up of a spin in this apparatus, the first polymer formed is pulled away and strung up to a suitable means for continuously withdrawing the polymer in filament form. Liquid reactant is metered to the J-tube reservoir 4 from the supply source, at a constant rate which is commensurate with continuity of spinning, where the liquid assumes the shape of an inverted cone with its apex at the surface of the bath. The process takes on the appearance of spinning a filament from a bubble and it will be referred to hereinafter as bubble spinning. The denier of the filament spun will be determined by several factors: the draw-off speed, higher speed giving finer denier yarn; the distance of the flare opening 3 beneath the solution surface, shorter distances favoring finer deniers; and the area of the opening, smaller openings yielding finer denier filaments. For spinning filaments to be drawn subsequently to textile deniers the diameter of the bubble is preferably about 3–8 mm. Draw-off speed is limited by the area of the opening and the rate of reaction of the intermediates. The J-tube opening 3 must be beneath the surface of the solution in tank 1 and it may be any distance beneath the surface, although distances from ⅛ to ⅜ of an inch are preferred. The various factors which control the denier of the filament spun may be manipulated at will to obtain the desired product whether it be heavy denier mono-filament or fine denier textile filament.

In some of the examples which follow the inherent viscosity of the polymer is given as an indication of the high molecular weight. In determining these values, viscosimeter flow times were obtained at $25.0°\pm0.1°$ C. for a solvent of the polymer and for a solution of the polymer in the solvent at a concentration of 0.5 gram per 100 cubic centimeters of solution. The inherent viscosity value was then calculated as 2 times the natural logarithm of the relative viscosity of the solution compared to that of the pure solvent.

In the examples which follow or appear subsequently in the specification, parts are by weight unless otherwise stated:

*Example 1*

Using the apparatus and technique described above in connection with Figure 1, a 10% by weight solution of adipyl chloride in chlorobenzene was fed slowly through the J-tube into a 2% by weight solution of hexamethylenediamine in water at 25° C. at the rate of about 0.1 gram of solution per minute. Polyhexamethylene adipamide formed instantaneously upon contact of the two solutions. The polymer was pulled away manually from the flared opening of the J-tube, strung up on a driven bobbin and the filament thus formed continuously wound up on the bobbin at the rate of 100 feet per minute. The continuous filament was extracted with methanol immediately after spinning and when dry it was shown to be three denier. The filament was stretched 2.3 times its length in the swollen state immediately after spinning and it was hot-drawn about 2X at 150° C. after extraction and drying. The drawn yarn had a break tenacity of 4.2 grams per denier. X-ray examination of the washed filament showed a highly crystalline pattern and after drawing the pattern clearly exhibited orientation. The inherent viscosity of the polymer was 1.26, measured in m-cresol.

The technique of this example was repeated using the same solution concentrations but reverse addition, that is, the diamine solution was fed into the chlorobenzene solution of adipyl chloride. There was essentially no difference in the results obtained.

*Example 2*

A 10% by weight solution of adipyl chloride in chlorobenzene was fed slowly as in Example 1 to a 2% by weight aqueous solution of diamines in the proportion 83% hexamethylenediamine and 17% 2-methyl hexamethylenediamine. The copolymer filament formed was wound up continuously. X-ray examination of the filament after methanol extraction showed that it was much less crystalline than the homo-polymer filament of Example 1. It could be cold-drawn readily to 3 times its original length and upon drawing exhibited a sharply oriented X-ray pattern. The polymer inherent viscosity was 1.20, measured in m-cresol.

*Example 3*

Using the procedure of Example 1, a ten per cent by weight solution of sebacyl chloride in chlorobenzene was fed slowly through a glass spinneret into a 17% solution of hexamethylenediamine in water. The polyamide formed was wound up continuously and the polymer was subsequently shown to have an inherent viscosity of 0.86, determined in m-cresol.

*Example 4*

Multifilament yarns can be spun readily by metering one reactant, or a solution thereof, through an ordinary viscose type spinneret into a solution of the other reactant. Spinneret holes of the conventional 0.001 to 0.100 inch in diameter are suitable. Preferably the yarn is spun upward as in bubble spinning.

Spinning may be carried out with the aid of spinning tubes, such as described in Millhiser U. S. Patent 2,440,057 or in Drisch et al. U. S. Patent 2,511,699. These tubes of relatively small diameter and of substantial length confine the bath filaments in their critical stage of formation so that no substantial tension is imposed on the filaments because the speed of the cocurrent bath flow through the tube is maintained only slightly below the speed of the filament bundle passing through the tube. It is thus possible to materially increase the rate of spinning over methods earlier described without substantial sacrifice in the desirable properties of the yarn produced.

Referring to Figure 4 of the drawings, reference numeral 30 designates a conduit for the forwarding of a solution of one of the intermediates to spinneret 32. The solution is extruded through the spinneret to form a plurality of filaments 34 upon contacting a bath comprising the other intermediate contained in tank 36. The filaments are passed through a tubular member 38 positioned near the bottom of the bath tank. The tank is made of sufficient depth that the head of liquid in the tank will cause a flow of the bath through the tube 38 at the desired velocity. The filaments and the bath thus flow cocurrently through the tube and into a receiving tank 40, from which the bath is returned to bath tank 36 through conduit 42 by means of pump 44. The filaments 34 are led over rollers 46 and 48 into a wash tank 50, as described in connection with Figure 1. The filaments are guided through the wash tank by rollers 51 and 52, which are positioned in the washing liquid, and then pass out of the tank, over another guide roller 54, and are drawn away by a suitable windup device.

A 10% by weight adipyl chloride solution in chlorobenzene was metered into a 2.5% aqueous solution of hexamethylenediamine using a platinum spinneret with 30 holes (hole diameter, 0.003 inch). A thirty-filament continuous yarn was formed and wound up. The polymer inherent viscosity was 1.05, measured in m-cresol.

*Example 5*

A 10% by weight terephthaloyl chloride solution in chlorobenzene was metered into a 25% aqueous solution of hexamethylenediamine using a platinum spinneret with 30 holes (hole diameter, 0.003 inch). A continuous thirty-filament yarn was produced. The polymer had an inherent viscosity of 0.74, measured in concentrated sulfuric acid.

It is advantageous to wash the freshly spun filaments and yarns immediately with a common solvent for the impurities being carried by the filaments from the reaction zone. In Example 1 the filament would carry such impurities as adipyl chloride, chlorobenzene and hexamethylenediamine and these are removed by the methanol wash. Any residual HCl can be removed by a dilute alkaline wash.

It is also advantageous to stretch the wet gel filaments from 2 to 4 times their spun length prior to drying in order to increase their strength and handleability. The dry yarn can be drawn up to 400% or higher at 25°–200° C. depending upon its composition. Copolymer yarns are not so crystalline as homopolymer yarns and can be drawn at lower temperatures than analogous homopolymer yarns.

In preparing filaments and yarns in the manner described, the ability to wind up the filaments continuously and the speed at which they can be wound depends considerably upon the specific reactants and diluents and their concentrations. For example, when using hexamethylenediamine and adipyl chloride as the reactants, the concentration of the hexamethylenediamine in the aqueous solution may be from about 1.0 to 20% by weight and preferably is from 1.5 to 7.5%. On the other hand, concentrations of adipyl chloride in chlorobenzene may range from 2 to 100% (pure adipyl chloride) by weight, with 3 to 25% being preferred. Much higher concentrations of hexamethylenediamine may be employed with other acid chlorides. Likewise, higher concentrations of other diamines may be used with adipyl chloride. The preferred concentrations to obtain optimum results from each set of reactants depend on the reactants themselves, their relative reactivities and the diluents involved.

Any two immiscible solvents for the reactants can be used to good advantage in the process of this invention. Miscible solvents can also be employed, but the molecular weight of the film and filamentary product thus formed are generally lower than when immiscible solvents are used. In addition, the windup speeds are lower. From the standpoint of economy and convenience, water is a preferred solvent, particularly when one of the reactants is a diamine, dithiol or a dihydroxyaryl compound. Other useful inert diluents for diamines are aliphatic alcohols, aliphatic glycols, and the like. In the preparation of polymeric articles which crystallize readily in an aqueous medium, it is sometimes desirable to employ a non-aqueous system so that the product is less crystalline and more susceptible to cold drawing. Obviously, the solvents for the respective reactants must be inert towards the reactant which they contain and relatively inert towards the reactant in the other phase. For example, water is inert to diamines and dihydroxyaryl compounds and comprises a suitable solvent for these reactants, while it is not completely inert with respect to dibasic acid chlorides. It is essential only that the solvents do not react as readily with either polymer-forming intermediate as does the other intermediate and thus reduce the probability of polymer formation. Among the inert materials which have been used successfully for diluting acid chloride reactants in interfacial polymerization are benzene, toluene, xylene, cyclohexane, trichloroethylene, chlorobenzene, nitrobenzene, heptane, ligroin, isooctane, ethyl ether, ethyl acetate, methyl amyl ketone, orthochlorobenzotrifluoride, ethylene dichloride, carbon tetrachloride, chloroform, thiophene and ethylene chlorobromide. For the bubble spinning type of process discussed, it has been found that solvents having a specific gravity of about 1 to 1.3 are preferred; e. g. chlorobenzene, nitrobenzene, orthochlorobenzotrifluoride, ethylene dichloride, and thiophene.

While in the preparation of polymers of high molecular weight from a diacid halide and a coreactant having at least two reactive hydrogen atoms in an aqueous emulsion system, it is desirable to add an HCl acceptor, such as an alkali hydroxide or carbonate, to the aqueous phase, it is not necessary to do so. The presence or absence of a soluble alkaline material in the aqueous phase does not seem to affect the process. Thus, when as much as three equivalents of alkali per equivalent weight of a diamine are used, the process is not noticeably affected in most cases, but the inherent viscosities of the products may be somewhat higher or lower, depending on the specific reactants involved. The particular advantage in using around at least an equivalent of alkali per equivalent of diamine in the bath is that it regenerates the diamine from any hydrochloride that forms in the bath and minimizes the recovery of diamine from spent bath liquors.

The process is ordinarily operated at room temperature although temperatures ranging from −10° C. to 90° C. have been used successfully. Wet, freshly spun yarn appears to be a swollen, elastic structure which can be stretched by varying amounts, depending upon the polymer and the reaction conditions. The yarn appears uniform and contains no nubs, particularly when the flare opening is between 1/8 and 3/8 of an inch below the surface of the bath. After extraction and drying, the denier by microscope is about twice the weight denier, and the yarn seems to be highly crenulated.

The yarn structure, such as cross-section, skin thickness crystallinity, etc., varies with spinning conditions. In addition to varying the reactants, diluents, temperature, etc. already mentioned, one can obtain advantageous effects in many cases by incorporating additives, such as aliphatic alcohols and glycols, glycerol, polyvinyl alcohol and water-soluble salts in the coagulating bath. Soaps and surface active agents may effect improvements or may prove to be deleterious depending upon the reactants and the technique involved. Filament action may be improved by adding thickeners to the organic phase, such as soluble polymeric materials.

Films and fibers can also be prepared with a simple apparatus of the type illustrated in Figures 2 and 3. Referring to Figure 2, the tank 20 contains both of the solutions of fast-reacting intermediates in liquid diluents; the denser solution 21 being on the bottom. The less dense material 22, floats on top of the denser material 21, forming an interface therewith at 23. A film of high molecular weight polymer quickly forms between the liquids and essentially stops the reaction until the film is removed. The film of polymer 24 can be picked up and removed from the tank in continuous manner by suitable forwarding or winding means. Preferably, the film 24 is led over a suitable roller 25 and washed free from impurities before windup, in the same manner as described previously in connection with Figure 1. A supply of reactants is maintained in the tank 20 by adding materials through pipes 26 and 27, respectively. Since the reaction takes place at or immediately adjacent to the interface, the thickness of either layer 21 or 22 is not critical, although the thickness of the upper layer 22 can determine to some extent the thickness of the film withdrawn and the speed of withdrawal.

The film obtained in this manner is a laminated structure as shown in Figure 2, unless special precautions are taken. The bond between these films comprising the laminate can be improved by passing the laminated film over hot rolls.

Single films can be prepared in various ways. If one places a bar across the width of the bath close to one end of the bath, a single film can be withdrawn between the bar and the end wall of the bath. Likewise, one can pull two single films from the central part of the bath by providing means to keep the films separated during withdrawal. The two single films are then led away from the bath over separate guide rollers.

The apparatus shown in Figure 2 can also be used to prepare a filamentary structure. The film of polymer at the interface 23 is merely picked up at one point and pulled away. In being drawn together in this way the film continuously forming at the interface collapses upon itself to form a highly crenulated filament which has the appearance of a rope but is actually a collapsed tube. Novelty effects can be obtained readily. For example, a filament within a filament was obtained from a three layered bath, with polymer forming continuously at the two interfaces, by picking up the film at the lower interface at one point and pulling it up through the upper interface and subsequently winding up the novel filament. The inside filament comes from the lower interface and may be a different polymer from the tubular coating formed at the upper interface. As an example, the lower layer may be a carbon tetrachloride solution of adipyl chloride, the middle layer an aqueous solution of hexamethylenediamine and in the upper layer a benzene solution of a diisocyanate, a glycol dichloroformate, a disulfonyl halide, adipyl chloride or another dicarboxylic acid chloride. The inside filament will then be polyhexamethylene adipamide and the outside coating will be a polyurea, a polyurethane, a polysulfonamide, polyhexamethylene adipamide or another polyamide, respectively.

An unexpected and desirable feature of the process for preparing films and fibers as described is that the process can be started and stopped at will with very little difficulty or waste. The polymer formed at the interface of the reacting solutions is not penetrated readily by the reactants. Consequently, the film does not become very thick, even upon long standing. The equipment can be shut down for several days, if necessary, and started up again from where it was left.

While it is usually preferable to operate the above process with the reactants dissolved in immiscible liquids so as to form an interface without the assistance of the film of polymer formed, both reactants can be dissolved in the same solvent or in miscible solvents. In this case the two solutions must be brought together very carefully so that thet polymer which forms upon contact of the two solutions serves as the interface and keeps the solutions from mixing freely. Once the interface is formed, it can be withdrawn continuously in the manner already described. The polymer formed in this manner is generally of lower molecular weight than that formed in systems involving immiscible liquids.

*Example 6*

Hexamethylenediamine (2.9 parts) was dissolved in 125 parts of water together with two parts of sodium hydroxide. Forty-four parts of benzene were floated on top of the above solution and to this system was added a solution of 5.08 parts of terephthaloyl chloride in 88 parts of benzene. Even as the first acid chloride solution was added, a polymeric film began to form at the benzene-water interface. This film could be pulled from the container continuously as a film or a rope and, as rapidly as this was done, new film was formed at the interface.

*Example 7*

Hexamethylenediamine (five parts) was dissolved in 55 parts of pure ethylene glycol. This solution was then poured carefully upon the face of 80 parts of a 20% by volume sebacyl chloride solution in carbon tetrachloride. A clear, tough film formed at the interface and was removed continuously and smoothly as a small rope of collapsed, tubular film by pulling from the center of the interface.

*Example 8*

Five parts by volume of sebacyl chloride was dissolved in 25 parts by volume of carbon tetrachloride and placed in a glass container. To this was added a solution made from ten parts by volume of 80% aqueous hexamethylenediamine and 40 parts by volume of water. Polymerization at the liquid interface started at once and the film was drawn away continuously. There was a tendency for the film to adhere to the glass surface. This tendency was reduced to a large extent by adding a small amount of a surface active agent, such as the sodium salt of a sulfonated fatty alcohol, to the aqueous phase. Under these conditions, the polymeric film was withdrawn from the interface and wound on a suitable support at the rate of 20 yards per minute.

Thus far the invention has been illustrated with an organic dicarboxylic acid chloride and an organic diamine, or a mixture of two diamines, as the fast-reacting intermediates. However, these are but a small fraction of the types of fast-reacting intermediates which are known to function satisfactorily in the process. Returning to the definition given early in the specification, one intermediate may be a low molecular weight organic compound having two or more similar or dissimilar reactive radicals selected from the group consisting of amino and amidino —NHR, wherein R is H or alkyl; phenolic —OH; and —SH. The other intermediate may be a low molecular weight organic compound having two or more reactive groups which are capable of reacting with ethyl alcohol at room temperature to form a compound having at least two ester groups. Any of such intermediates can be used in the process described for the direct preparation of films and filaments of condensation polymers containing polyamide and/or polyester links in their molecular chains.

"Recurring amide links", as used herein, are groups such as

and

which constitute part of the linear polymer chain, wherein Y is oxygen or sulfur and R' is hydrogen or a monovalent hydrocarbon radical. The ester links comprise groups such as

and

which form an integral part of the linear polymer chain, wherein Y is oxygen or sulfur. The polycarbonamides, that is, polymers containing the

group as defined above, include the simple polyamides, such as polyhexamethylene adipamide, and polyureas, polyurethanes, polythioureas, and polyesteramides. Illustrative of fast-reacting intermediates which can be used to prepare such polymers in accordance with this invention are the following, wherein R and R'' are divalent hydrocarbon radicals, X is halogen, R', $R_1$, and $R_2$ are hydrogen or monovalent hydrocarbon radicals, and Y is oxygen or sulfur:

1. Dicarboxylic acid halides+primary or secondary diamines,

2. Phosphoric anhydrides of dicarboxylic acids+diamines,

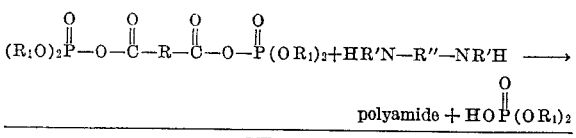

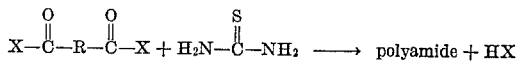

3. Dicarboxylic acid halides+thiourea

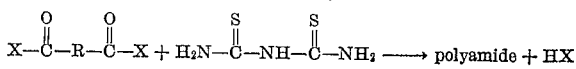

4. Dicarboxylic acid halides+dithiobiuret

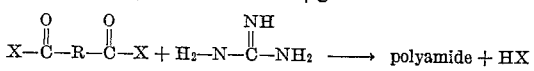

5. Dicarboxylic acid halides+guanidine

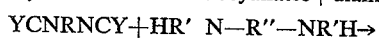

6. Diisocyanates or diisothiocyanates+diamines

YCNRNCY+HR' N—R''—NR'H→ polyureas or polythioureas

7. Phosgene+diamines,

Cl—C(=O)—Cl + HR'N—R''—NR'H ⟶ polyureas + HCl

8. Bis-azlactones+diamines

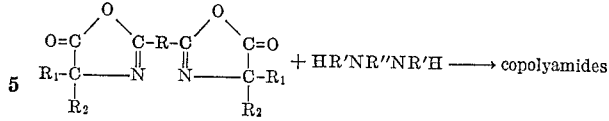

having recurring structural groups of the following type:

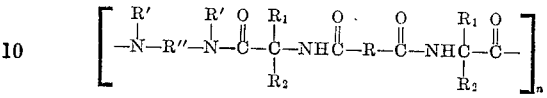

9. Mixed anhydrides of dicarboxylic acids and trifluoroacetic acid+diamines

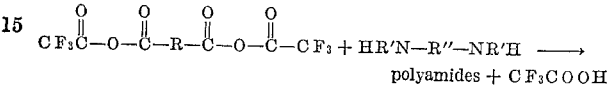

10. Glycol-chloroformates+diamines

11. Dicarboxylic acid halides+aminothiol or aminoalkyl phenol

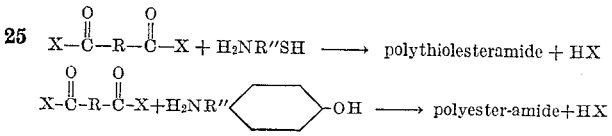

The polysulfonamides containing the

group in the polymer chain may be prepared in film or filament form according to this invention from the following fast reacting intermediates:

12. Disulfonic acid halides+diamines

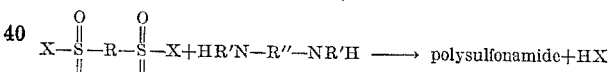

13. Disulfonic acid halides+guanidine, thiourea, or dithiobiuret

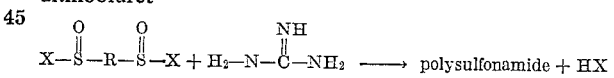

14. Disulfonyl dilactams+diamines

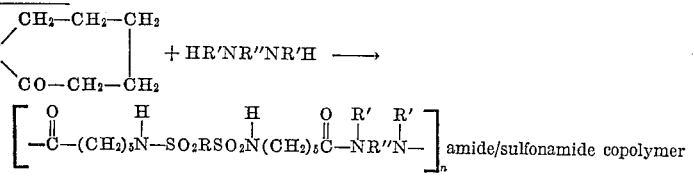

Illustrative of fast-reacting intermediates which can be used to prepare polyesters in accordance with this invention are the following:

15. Dicarboxylic acid halides+dihydric phenols

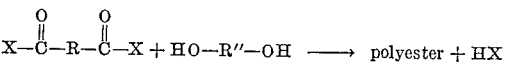

16. Dicarboxylic acid halides+dithiols

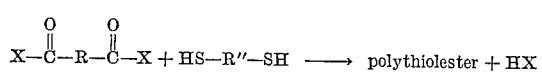

17. Mixed anhydrides of dicarboxylic acids and trifluoroacetic acid+dithiols or dihydric phenols

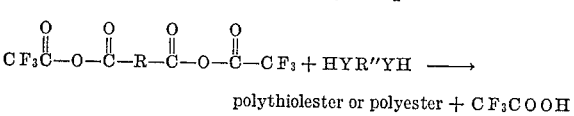

18. Disulfonic acid halides+dihydric phenols

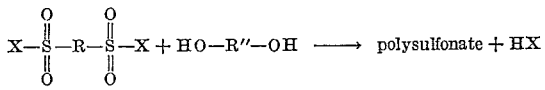

19. Disulfonic acid halides+dithiols

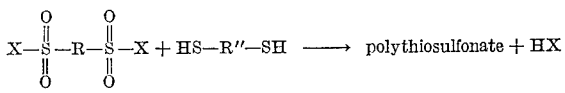

The process of the invention will now be illustrated with a number of reactions of the above types.

*Example 9*

Adiphyl dibutyl phosphate was dissolved in an equal volume of carbon tetrachloride and on top of this was floated an aqueous solution of 8 parts hexamethylenediamine and 10 parts sodium acetate in 82 parts of water. A fairly tough film formed at the interface, but its formation was too slow for withdrawal as a continuous structure to be practical.

*Example 10*

Thiourea (5 parts) and 2 parts of sodium hydroxide were dissolved in 150 parts of water and a solution of 5 parts by volume of sebacyl chloride in 95 parts by volume of xylene was floated on top. A slightly hazy limp film formed at the liquid interface and could be withdrawn continuously at a slow rate.

*Example 11*

Thiourea (10 parts) and 6 parts of sodium hydroxide were dissolved in 150 parts of water and was floated on top of a solution of 5 parts by volume of sebacyl chloride in 95 parts by volume of carbon tetrachloride. Polymerization at the interface was faster than in Example 10. The resulting film was withdrawn continuously at a slow rate.

*Example 12*

Dithiobiuret (5 parts) and 2 parts of sodium hydroxide were dissolved in 150 parts of water and a solution of 5 parts by volume of sebacyl chloride in 95 parts by volume of xylene was floated on top. A limp film formed at the interface and was withdrawn continuously.

*Example 13*

Guanidine thiocyanate (5.9 parts) and 2 parts of sodium hydroxide were dissolved in 50 parts of water and floated on top of a solution of 3 parts by volume of sebacyl chloride in 27 parts by volume of carbon tetrachloride. The two layers were heated to 45° C. A slightly hazy film formed at the interface and was withdrawn continuously at a slow rate.

*Example 14*

Guanidine thiocyanate (6 parts) and 2 parts of sodium hydroxide were dissolved in 50 parts of water and a solution of 3 parts by volume of sebacyl chloride in 30 parts by volume of methyl amyl ketone was floated on top. A faster reaction took place than in Example 13 and the resulting polymeric film was withdrawn continuously as a rope.

*Example 15*

Piperazine (5 parts on an anhydrous basis) was dissolved in water and 50 parts by volume of a solution of 5 parts by volume of hexamethylenediisocyanate in isooctane was floated on top. The two layers were heated to 90° C. and the tough polymeric gel film which formed at the interface was withdrawn continuously at a slow rate.

*Example 16*

Ethylene-bis-chloroformate (9.35 parts) was dissolved in 160 parts of carbon tetrachloride and a solution of 5.8 parts of hexamethylene diamine and 4 parts of sodium hydroxide in 100 parts of water was floated on top. The film which formed at the interface was pulled away continuously. The polymer had an inherent viscosity of 0.76 in metacresol.

*Example 17*

A solution of 7 parts of m-benzene disulfonyl chloride in 39 parts of o-dichlorobenzene was heated to 90° C. A solution of 2.95 parts of hexamethylene diamine and 2 parts of sodium hydroxide in 45 parts of water was also heated to 90° C. and was floated on the heavier solution. A film formed slowly at the liquid interface, but its formation was too slow for continuous withdrawal. The film was washed with hot water and dried. It had a softening temperature of 160–165° C. and an inherent viscosity in sulfuric acid of 1.01.

*Example 18*

A solution of 5.7 parts of 2,2-bis(4-hydroxyphenyl) propane and 2 parts of sodium hydroxide in water was prepared and floated on a solution of 5.1 parts of isophthaloyl chloride in 240 parts of carbon tetrachloride. A clear film formed immediately at the interface which could be pulled away at the rate of 2 to 3 feet per minute. The resultant polymer had an inherent viscosity of 0.36 in chloroform. The film can be drawn 2X at 100° C.

*Example 19*

Ethane dithiol (1.18 parts) was dissolved in 35 parts of water containing 1.05 parts of sodium hydroxide. A solution of 2.54 parts of isophthaloyl chloride in 31 parts of benzene was floated on top. A film formed immediately at the interface but could not be removed continuously at first. The two layers were allowed to remain in contact for several hours and the film could then be withdrawn in the form of a continuous rope.

*Example 20*

Using the same procedure as in Example 19, but substituting terephthaloyl chloride for the isophthaloyl chloride, a self-supporting film was obtained after several hours, but could not be withdrawn continuously.

*Example 21*

Ethane dithiol (1.06 parts) was dissolved in 35 parts of water containing 0.9 part of sodium hydroxide and a solution of 3 parts of m-benzene disulfonyl chloride in 31 parts of benzene was floated on top. A film formed instantly at the interface but could not be withdrawn as a continuous film.

*Example 22*

A solution of 4 parts of sebacyl chloride in 70 parts of xylene was floated on a solution of 2 parts hexamethylenediamine in 45 parts of dry ethylene glycol. A tough gel film formed immediately which was readily withdrawn continuously as a rope. The rope was washed with ethyl alcohol containing 5% of concentrated hydrochloric acid, then with alcohol and finally with water and dried. The polymer had an inherent viscosity of 1.12 in metacresol.

In addition to those shown in the examples, copolymers which are insoluble and infusible in the as-spun state have been prepared by incorporating minor amounts of polyfunctional reactants in the process of this invention, e. g., trimethylenetetramine and/or tricarballylic acid chloride.

In general, this invention provides a revolutionary and highly useful tool for preparing films and fibers comprising high molecular weight condensation polymers. The process circumvents many of the normal steps required for converting polymeric materials into useful shaped articles. It provides the only method for the preparation of shaped articles from certain polymeric materials. For example, many condensation polymers having structures which are commensurate with interesting and desirable physical properties have not been made and exploited because the intermediates used in their preparation are unstable at the high temperatures normally required in the condensation reaction. This invention provides a method for preparing these novel polymers of sufficiently high molecular weight at room temperatures and in the form of useful shaped articles. Likewise, intermediates heretofore considered too impure for conventional melt polymerization can be used. In addition, there is no need to maintain a delicate balance of materials in order to obtain high molecular weight polymer as is required by the melt method of polymerization. Finally, new products are available in that relatively insoluble and infusible polymers in the form of useful shaped articles can be prepared by a simple process.

As many different embodiments of the present invention may be made without departing from the spirit and scope thereof, it is to be understood that the invention is not limited to the specific embodiments disclosed except to the extent defined in the appended claims.

What is claimed is:

1. A process for the direct formation of condensation polymer films and filaments from intermediates which comprises conducting an interphase polymerization between fast-reacting organic condensation polymer-forming intermediates at a continuing interface of controlled shape between two liquid phases each containing an intermediate which reacts rapidly with an intermediate in the other phase to form a shaped polymer, separating the phases and insoluble therein and withdrawing the polymer from said interface.

2. A process for producing self-supporting shaped structures of condensation polymer directly from intermediates which comprises conducting an interphase polymerization between fast-reacting organic condensation polymer-forming intermediates at a bubble-shaped interface of substantially fixed locus between two liquid phases each containing an intermediate which reacts rapidly with an intermediate in the other phase to form a shaped polymer separating the phases and insoluble therein, withdrawing the polymer from said interface at a rate which is commensurate with continuity of polymer formation to form a continuous structure, and supplying said intermediates to said interface at rates commensurate with the rate at which said structure is withdrawn.

3. A process for spinning continuous filaments of condensation polymer directly from intermediates which comprises conducting an interphase polymerization between fast-reacting organic condensation polymer-forming intermediates at the interfaces between a liquid bath and filament-shaped liquid streams issuing from a spinneret, each of said liquids containing an intermediate which reacts rapidly with an intermediate in the other liquid to form a shaped polymer separating the liquids and insoluble therein, withdrawing the polymer from said interfaces at a rate which is commensurate with continuity of polymer formation to form a continuous yarn, and supplying said intermediates to the bath and spinneret at rates commensurate with the rate at which said yarn is withdrawn.

4. A process for the direct formation of condensation polymer films and filaments by an interphase polymerization between fast-reacting organic intermediates which comprises bringing a liquid phase comprising at least one organic condensation polymer-forming intermediate and a second liquid phase together to form a continuing interface of substantially fixed locus between the phases, said second phase comprising at least one organic intermediate capable of reacting rapidly with said intermediate of the first phase to form a polymer insoluble in the phases, controlling the shape of said interface until a shaped polymer has formed separating the phases and then withdrawing the polymer from said interface.

5. A process as defined in claim 4 wherein said intermediates are fast-reacting at moderate temperatures and the temperature is maintained within the range of −10 to 90° C.

6. A process as defined in claim 4 wherein each liquid phase is a solution of at least one intermediate in an inert diluent and the two diluents are immiscible.

7. A process for the direct formation of condensation polymer films and filaments by an interphase polymerization between fast-reacting intermediates which comprises bringing two liquid phases together to form a continuing interface of substantially fixed locus between the phases, one of said phases comprising at least one low molecular weight organic intermediate having at least two reactive groups selected from the group consisting of amino and amidino-NHR wherein R is H or alkyl, phenolic —OH, and —SH, and the other phase comprising at least one low molecular weight organic intermediate having at least two reactive groups each of which is capable of reacting with ethyl alcohol at room temperature to thereby yield a compound having two ester groups, controlling the shape of said interface until a shaped polymer has formed separating the phases and insoluble therein and then withdrawing the polymer from said interface.

8. A process for the direct formation of superpolyamide films and filaments from polyamide-forming intermediates which comprises bringing a liquid phase comprising an organic diamine and another liquid phase comprising an organic dicarboxylic acid halide together to form a continuing interface of substantially fixed locus between the phases, controlling the shape of said interface until a shaped polymer, insoluble in the phases, has formed between the phases, and then withdrawing the polymer from said interface.

9. A process for the direct formation of superpolyester films and filaments from polyester-forming intermediates which comprises bringing a liquid phase comprising a dihydroxyaryl compound and another liquid phase comprising an organic dicarboxylic acid halide together to form a continuing interface of substantially fixed locus between the phases, controlling the shape of said interface until a shaped polymer, insoluble in the phases, has formed between the phases, and then withdrawing the polymer from said interface.

10. A process for the direct formation of superpolyurethane films and filaments from polyurethane-forming intermediates which comprises bringing a liquid phase comprising an organic diamine and another liquid phase comprising a glycol dihaloformate together to form a continuing interface of substantially fixed locus between the phases, controlling the shape of said interface until a shaped polymer, insoluble in the phases, has formed between the phases, and then withdrawing the polymer from said interface.

11. A process for the direct formation of superpolyurea films and filaments from polyurea-forming intermediates which comprises bringing a liquid phase comprising an organic diamine and another liquid phase comprising an organic compound having two reactive isocyanate radicals together to form a continuing interface of substantially fixed locus between the phases, controlling the shape of said interface until a shaped polymer, insoluble in the phases, has formed between the phases, and then withdrawing the polymer from said interface.

12. A process for the direct formation of superpolythiolester films and filaments for polythiolester-forming intermediates which comprises bringing a liquid phase comprising an organic dithiol and another liquid phase comprising an organic dicarboxylic acid halide together to form a continuing interface of substantially fixed locus between the phases, controlling the shape of said interface until a shaped polymer, insoluble in the phases, has formed between the phases, and then withdrawing the polymer from said interface.

13. A process for spinning continuous films and filaments of condensation polymer directly from polymer-forming intermediates which comprises forming a bath of liquid diluent containing at least one organic condensation polymer-forming intermediate, continuously introducing into the bath a liquid phase comprising at least one organic intermediate capable of reacting rapidly at moderate temperatures with said intermediate of the bath to form a spinnable polymer which is insoluble in said liquids, bringing said intermediates together at a shaped interface of substantially fixed locus within said bath and withdrawing polymer from said interface as a continuous structure at a rate commensurate with the rate at which said liquid phase is introduced.

14. A process as defined in claim 13 wherein said interface is formed by introducing said liquid phase into the bath as filament-shaped streams issuing from a spinneret.

15. A process as defined in claim 13 wherein said interface is bubble-shaped.

16. A process as defined in claim 13 wherein said interface is film-shaped.

17. A process as defined in claim 13 wherein said interface is in the shape of a bubble which is maintained within the range of 3 to 8 millimeters in diameter.

18. A process as defined in claim 13 wherein the continuous structure is spun upward from a bubble-shaped interface located from 1/8 to 3/8 of an inch below the surface of the bath.

19. A process for spinning continuous filaments of condensation polymer directly from polymer-forming intermediates which comprises spinning a liquid diluent solution upwardly into a bath of immiscible diluent solution and forming a continuing liquid interface of substantially fixed locus between the solutions, one of said solutions containing at least one low molecular weight organic intermediate having two reactive groups selected from the group consisting of amino and amidino-NHR, wherein R is H or alkyl, phenolic —OH, and —SH, and the other of said solutions containing at least one low molecular weight organic intermediate having two reactive groups, each of which is capable of reacting with ethyl alcohol at room temperature to thereby yield a compound having two ester groups, the shape of said interface being controlled to have at least one dimension considerably greater than the thickness of polymer to be formed and being maintained in said fixed location until a shaped polymer insoluble in each said liquid diluent solution has formed and withdrawing polymer upwardly from the interface as a continuous filament at a rate commensurate with the rate at which the solution is spun into the bath.

20. A process as defined in claim 19 wherein the latter intermediate is dissolved in a water-immiscible diluent having a specific gravity of about 1 to 1.3, and this solution is spun into an aqueous alkaline solution of the other intermediate.

21. A process for the direct formation of films of condensation polymer from polymer-forming intermediates which comprises forming a liquid diluent solution containing one of a pair of fast-reacting organic intermediates capable of forming a superpolymer, floating a liquid diluent solution containing the other intermediate on top of the first solution to form a horizontal interface between the solutions, providing sufficient time for a film of condensation polymer, insoluble in each said liquid diluent solution to form between the solutions, and then withdrawing the film.

22. A spinning medium for forming films and filaments of condensation polymer directly from intermediates, comprising two liquid phases of fast-reacting organic polymer-forming intermediates separated by a standing thin solid film of said polymer.

23. A spinning medium for forming films and filaments of condensation polymer directly from intermediates, comprising two liquid phases separated by a standing thin solid film of superpolymer, one of said liquid phases comprising at least one organic condensation polymer-forming intermediate and the other liquid phase comprising at least one organic intermediate capable of condensing rapidly at moderate temperatures with said intermediate of the first liquid phase to form said superpolymer.

24. A two-phase medium for forming films and filaments of condensation polymer directly from intermediates, comprising a first liquid phase comprising at least one low molecular weight organic intermediate having two reactive groups selected from the group consisting of amino and amidino —NHR wherein R is H or alkyl, phenolic —OH, and —SH, and a second liquid phase comprising at least one low molecular weight organic intermediate having two reactive groups each of which is capable of reacting with ethyl alcohol at room temperature to thereby yield a compound having two ester groups said two phases being separated by a thin solid film of substantially fixed locus, said film being formed of a superpolymer reaction product of said intermediates.

25. A two-phase medium for forming films and filaments of condensation polymer directly from intermediates, comprising a liquid phase supported within a second liquid phase, one of said liquid phases comprising at least one organic condensation polymer-forming intermediate and the other liquid phase comprising at least one organic intermediate capable of reacting rapidly at moderate temperatures with said intermediate of the first liquid phase to form a superpolymer said two phases being separated by a thin solid film of substantially fixed lcous, said film being formed of a superpolymer reaction product of said intermediates.

26. A two-phase medium for forming films and filaments of condensation polymer directly from intermediates, comprising a liquid phase floating on top of a second liquid phase, one of said liquid phases comprising at least one organic condensation polymer-forming intermediate and the other liquid phase comprising at least one organic intermediate capable of condensing rapidly at moderate temperatures with said intermediate of the first liquid phase to form a superpolymer said two phases being separated by a thin solid film of substantially fixed locus, said film being formed of a superpolymer reaction product of said intermediates.

References Cited in the file of this patent

FOREIGN PATENTS

| 53,325 | France | Jan. 22, 1945 |
|---|---|---|
| | (First addition to No. 892,361) | |
| 892,361 | France | Jan. 7, 1944 |
| 895,395 | France | Apr. 3, 1944 |

OTHER REFERENCES

Fryling et al., Ind. & Eng. Chem., vol. 36, 1944, pp. 114–117.